United States Patent
Hiraishi

(10) Patent No.: US 9,250,845 B2
(45) Date of Patent: Feb. 2, 2016

(54) BOOKBINDING PRINTING SYSTEM, INFORMATION PROCESSING APPARATUS, METHOD FOR CONTROLLING THE SAME, AND STORAGE MEDIUM

(71) Applicant: CANON KABUSHIKI KAISHA, Tokyo (JP)

(72) Inventor: Tomonobu Hiraishi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/272,169

(22) Filed: May 7, 2014

(65) Prior Publication Data
US 2014/0340714 A1    Nov. 20, 2014

(30) Foreign Application Priority Data
May 14, 2013   (JP) .................................. 2013-102583

(51) Int. Cl.
G06F 3/12       (2006.01)
H04N 1/387     (2006.01)

(52) U.S. Cl.
CPC .............. *G06F 3/125* (2013.01); *G06F 3/1208* (2013.01); *G06F 3/1247* (2013.01); *G06F 3/1285* (2013.01); *H04N 1/387* (2013.01)

(58) Field of Classification Search
None
See application file for complete search history.

(56) References Cited

U.S. PATENT DOCUMENTS

2009/0290169 A1* 11/2009 Kobashi ......................... 358/1.2
2011/0043863 A1*  2/2011 Saka ............................. 358/3.24
2012/0268792 A1* 10/2012 Ozaki ........................... 358/1.18

FOREIGN PATENT DOCUMENTS

JP        2002-331730 A    11/2002
JP        2011-186927 A     9/2011

* cited by examiner

*Primary Examiner* — Benny Q Tieu
*Assistant Examiner* — Haris Sabah
(74) *Attorney, Agent, or Firm* — Canon USA, Inc. I.P. Division

(57) ABSTRACT

The present invention is directed to, even when dividing an image arranged between a plurality of pages constituting facing pages before bookbinding printing, preventing different results of correction processing of images on the facing pages after bookbinding printing. An editing system lays out images on facing pages, divides an image laid out on facing pages to generate division images for respective single-side pages, and inserts the division images into the respective single-side pages to generate respective document data. Then, a printing control system extracts division images from the document data, combines the division images, performs correction processing on the combined image, divides the corrected combined image, inserts the division images into the respective document data to update it, and performs print processing based on the updated document data.

8 Claims, 12 Drawing Sheets

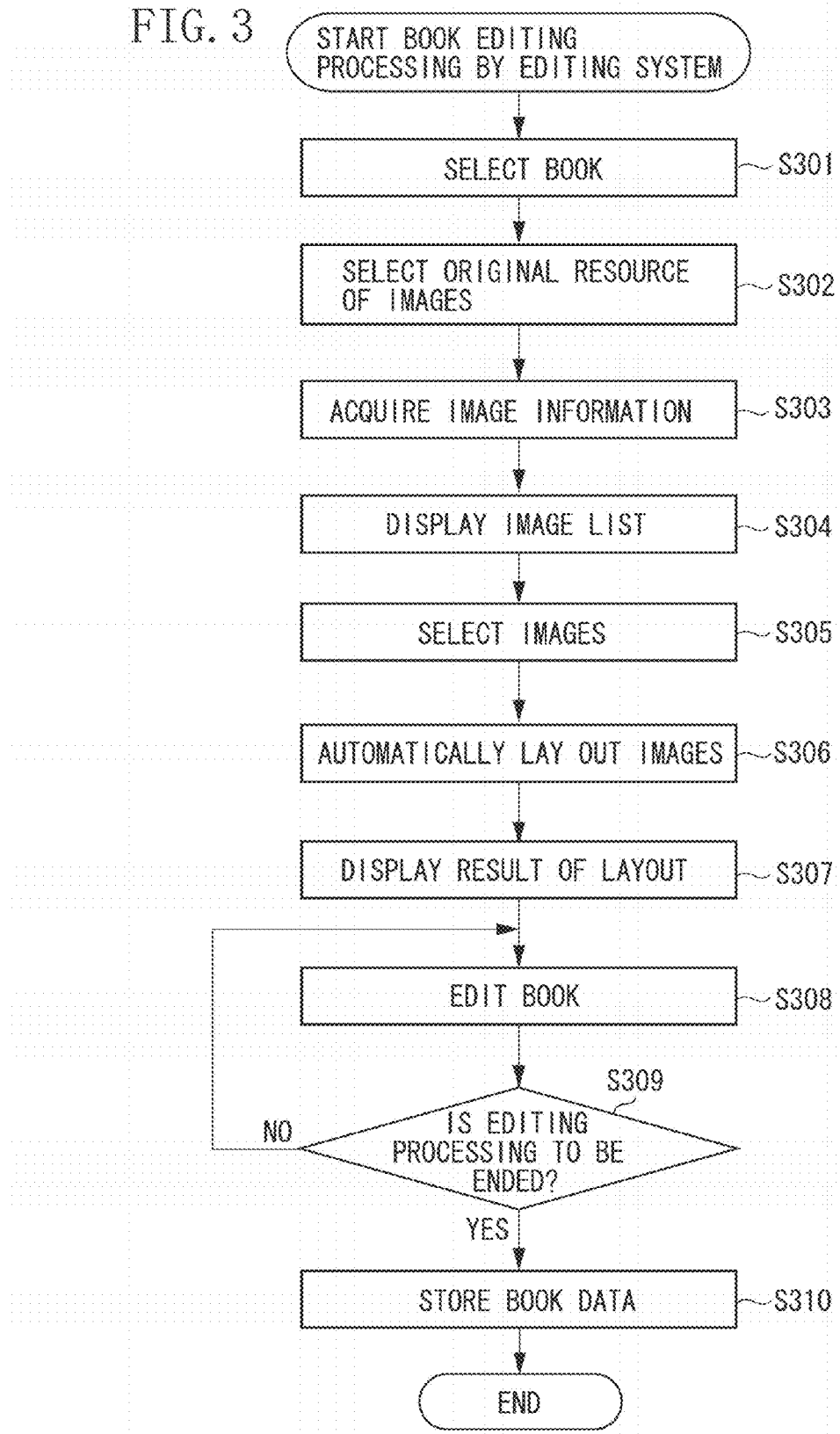

BOOKBINDING PRINTING SYSTEM, INFORMATION PROCESSING APPARATUS, METHOD FOR CONTROLLING THE SAME, AND STORAGE MEDIUM

BACKGROUND OF THE INVENTION

1. Field of the Invention

The present invention relates to a technique for adjusting images arranged on facing pages to the same tint when performing bookbinding printing, for example, according to an electronic book data format.

2. Description of the Related Art

Conventionally, there has been a technique for selecting a plurality of images, arranging the images in order of the selection, image capture data, or file name, and laying them out on pages of an electronic book (Japanese Patent Application Laid-Open No. 2011-186927).

Then, bookbinding printing is performed on the images, for example, according to an electronic book data format. Unlike the display of an electronic book, once a book is bound, the book cannot be opened all the way to a gutter depending on the way of binding. Therefore, the center portion between facing pages may be hidden. Therefore, white space is formed at the center portion between facing pages (Japanese Patent Application Laid-Open No. 2002-331730). In this case, if an image is arranged across the gutter between facing pages, an image portion arranged at the center portion between facing pages will be missing. On the other hand, if an image is arranged on each of the right and left pages constituting facing pages instead of being arranged at the center portion between facing pages, no image portion is hidden or missing after bookbinding printing.

Accordingly, it is assumed to divide an image arranged between facing pages into right and left pieces, and add a space to the page binding area. Thus, pieces of images are respectively arranged on the right and left pages.

In this case, however, similar to originally separate images, the images respectively arranged on the right and left pages are to be separately subjected to correction processing as different images. Therefore, there has been a problem that, for example, different color adjustment processing is applied to each of the right and left division images resulting in different tint between the right and left images although they will become a continuous image after bookbinding printing.

SUMMARY OF THE INVENTION

To solve the above-described problem, a bookbinding printing system according to the present invention includes an editing system and a printing control system. The editing system includes a layout unit configured to lay out images on facing pages, a first division unit configured to divide an image laid out on facing pages to generate division images for the respective single-side pages, a generation unit configured to generate document data by inserting the division images generated by the first division unit into the respective single-side pages, and a transmission unit configured to transmit the document data to a printing control system. The printing control system includes an extraction unit configured to extract division images from the transmitted document data, a combining unit configured to combine the division images to generate a combined image, a correction unit configured to perform correction processing on the combined image, a second division unit configured to divide the corrected combined image to generate division images, an updating unit configured to update the document data by inserting the division images generated by the second division unit into the respective document data, and a print processing unit configured to perform print processing based on the updated document data.

Further features of the present invention will become apparent from the following description of exemplary embodiments with reference to the attached drawings.

BRIEF DESCRIPTION OF THE DRAWINGS

FIG. 3 illustrates exemplary electronic book editing processing by the editing system according to an exemplary embodiment of the present invention.

DESCRIPTION OF THE EMBODIMENTS

Various exemplary embodiments, features, and aspects of the invention will be described in detail below with reference to the drawings.

However, components described in the following exemplary embodiments are illustrative and are not meant to limit the scope of the invention.

Figure 1:
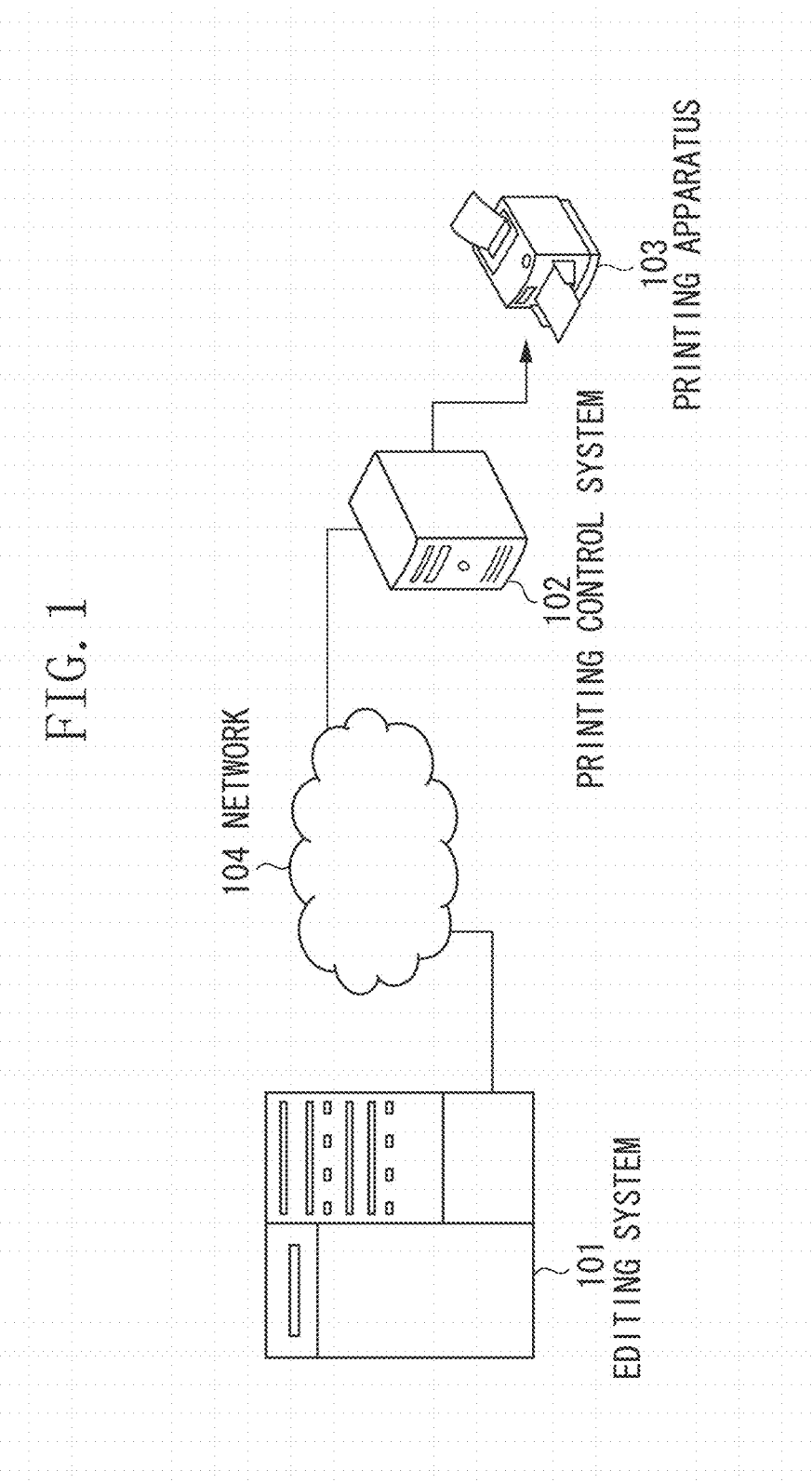
FIG. 1 is a block diagram illustrating an exemplary configuration of a bookbinding printing system according to an exemplary embodiment of the present invention.

The overall configuration of a bookbinding printing system according to a first exemplary embodiment will be described below with reference to FIG. 1.

In response to a user operation, an editing system 101 performs electronic book editing processing, generates book data based on the result of the editing, and stores the resultant book data. It is also possible that an information processing apparatus of the user performs electronic book editing processing and book data generation processing, and the editing system 101 receives book data from the information processing apparatus via a network 104, and stores the relevant book data. Then, the editing system 101 generates document data and a job ticket based on the book data, and transmits them to a printing control system 102 via the network 104.

Upon receiving the document data and the job ticket from the editing system 101, the printing control system 102 performs print processing, such as data format conversion processing and color processing, and instructs a printing apparatus 103 to perform printing. Then, a print product is subjected to bookbinding processing.

The network 104 is the Internet, a local area network (LAN), or a public line.

The present invention is useful particularly when the editing system 101 and the printing control system 102 are separately implemented. Therefore, the present exemplary embodiment will be described below based on a case where the editing system 101 and the printing control system 102 exist independently of each other. However, even in a case where the editing system 101 and the printing control system 102 are incorporated in the same system, the present exemplary embodiment is similarly applicable.

Although, the present exemplary embodiment explains a case of one editing system 101, one printing control system 102, and one printing apparatus 103, there may be more than one (a plurality of) systems and apparatus.

The configuration of a computer apparatus constituting the editing system 101 and the printing control system 102 according to the present exemplary embodiment will be described below with reference to the block diagram illustrated in FIG. 2. Each of the editing system 101 and the printing control system 102 may be implemented as a single computer apparatus. Alternatively, respective functions may be distributed to a plurality of computer apparatuses, i.e., the necessary number of computer apparatuses. When the editing system 101 and the printing control system 102 are implemented as a plurality of computer apparatuses, they are communicably connected with a LAN.

Figure 2:
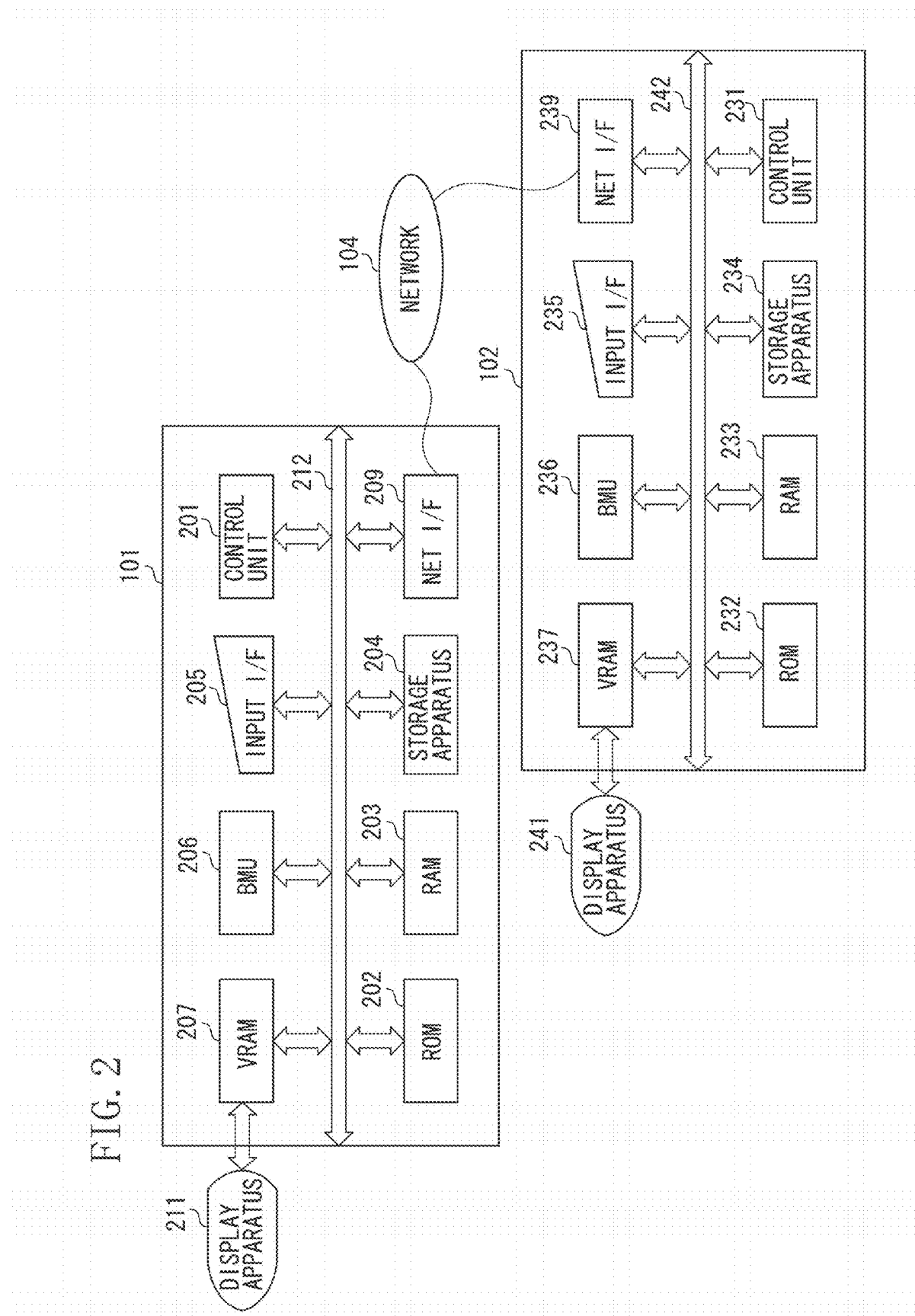
FIG. 2 is a block diagram illustrating an exemplary configuration of a computer apparatus according to an exemplary embodiment of the present invention.

Referring to FIG. 2, the control units 201 and 231 are, for example, central processing units (CPUs) which control the entire editing system 101 and the printing control system 102, respectively. Read only memories (ROMs) 202 and 232 store programs and parameters which do not need to be changed. Random access memories (RAMs) 203 and 233 temporarily store programs and data supplied from an external apparatus. Storage apparatuses 204 and 234 are hard disk drives (HDDs) installed in the editing system 101 and the printing control system 102, respectively. Each of the storage apparatuses 204 and 234 is a solid-state drive (SSD) including a flash memory, or a hybrid drive including a hard disk and a flash memory, or a memory card. The storage apparatuses 204 and 234 store programs, such as an operating system (OS). Input interfaces 205 and 235 receive a user operation, and connect with an input device for inputting data, such as a pointing device and a keyboard. Bit Move Units (BMUs) 206 and 236 control data transfer, for example, between memories and between a memory and each I/O device. Specifically, the BMU 206 controls data transfer between a VRAM 207 and another memory and between a memory and a network interface 209. The BMU 236 controls data transfer between a VRAM 237 and another memory and between a memory and a network interface 239. Video RAMs (VRAMs) 207 and 237 draw images to be displayed on display units 211 and 241, respectively. Images generated in the VRAM 207 and 237 are transmitted to the display units 211 and 241, respectively, according to a predetermined rule. Thus, the display units 211 and 241 display the images. The network interfaces 209 and 239 are connected to the network 104. System buses 212 and 242 communicably connect the units 201 to 209 and the units 231 to 239.

Book data generation processing performed by the editing system 101 according to the present exemplary embodiment will be described below with reference to FIG. 3. The following processing is implemented when the control unit 201 of the editing system 101 reads an electronic book editing application program from the storage apparatus 204, and controls each of the above-described modules according to the program.

In step S301, in response to a user operation, the control unit 201 selects an electronic book subjected to editing, and acquires a book identifier (ID) for uniquely identifying the relevant electronic book. When the user selects an existing electronic book, the control unit 201 acquires a book ID thereof, reads the book data associated with the book ID from the storage apparatus 204, and performs the following processing for re-editing and updating the read book data. When the user selects a new electronic book, the control unit 201 issues a new book ID.

In step S302, in response to a user operation, the control unit 201 selects an original resource of images to be laid out on pages of the electronic book. For example, as an original resource of images, the user selects a folder of the storage apparatus 204 in which images are stored, or a storage apparatus on the network 104 from which images can be downloaded via the network interface 209.

In step S303, the control unit 201 acquires images from the original resource selected in step S302. When the user selects a folder of the storage apparatus 204, the control unit 201 acquires attribute information of images, such as the file path to original image files, thumbnail images, file names, from the storage apparatus 204. When the user selects a storage apparatus on the network 104, the control unit 201 acquires attribute information of images via the network interface 209.

In step S304, based on the attribute information of images acquired in step S303, the control unit 201 generates an image list screen including thumbnail images, and controls the display unit 211 to display the screen. In step S305, the user performs an operation for selecting layout target images out of the thumbnail images in the image list screen, and the control unit 201 selects the relevant images in response to the user operation.

In step S306, the control unit 201 automatically lays out the thumbnail images selected in step S305 on each page of the electronic book in predetermined order to generate page data for initial display.

Figure 4A:
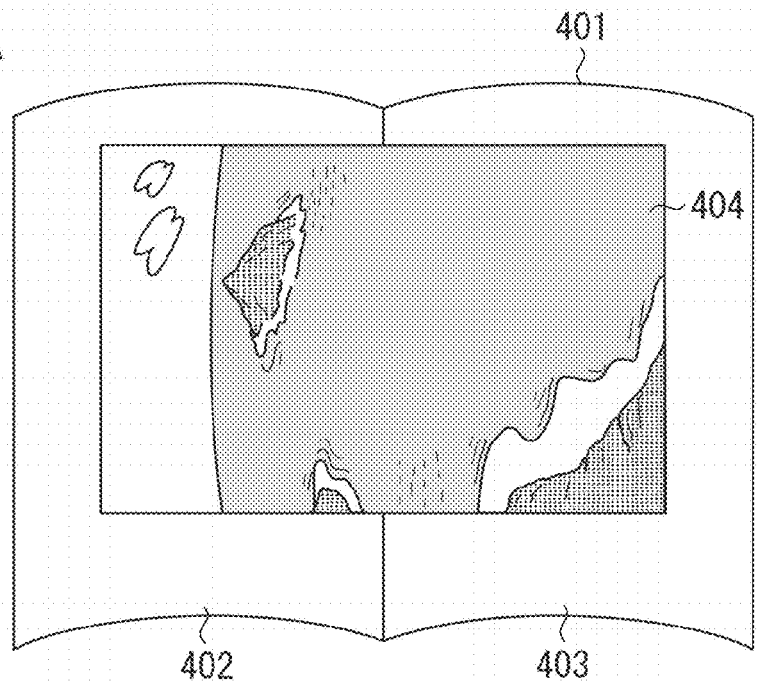
FIGS. 4A and 4B illustrate an exemplary preview of an electronic book according to an exemplary embodiment of the present invention.
Figure 4B:
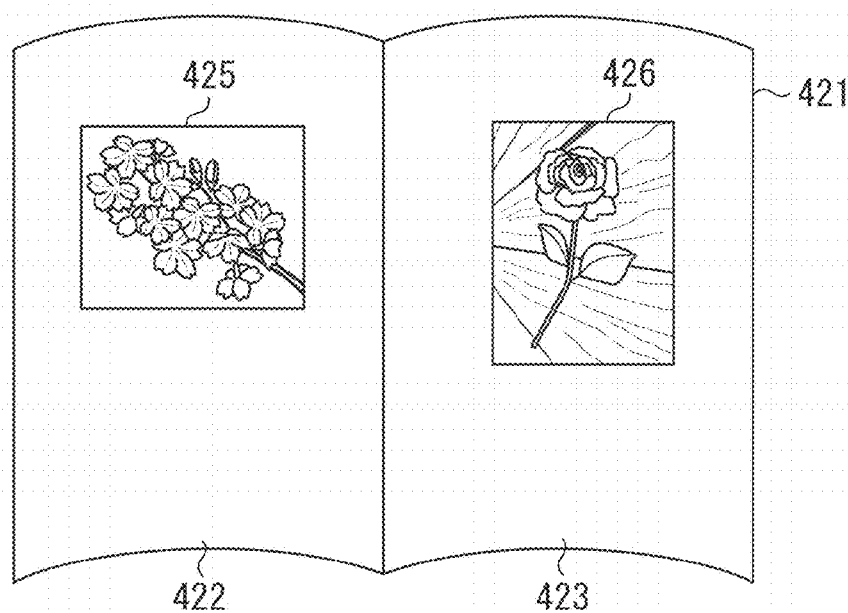

In step S307, the control unit 201 displays pages of the electronic book on the display unit 211 according to the page data for initial display generated in step S306. For example, as illustrated in FIG. 4A, a thumbnail image 404 can be laid out between a right page 403 and a left page 402 constituting facing pages 401. As illustrated in FIG. 4B, thumbnail images 426 and 425 can be separately laid out on a right page 423 and a left page 422, respectively, constituting facing pages 421.

The present exemplary embodiment will be described below based on two different cases. In one case, an image is laid out between facing pages. In the other case, an image is laid out on each of the right side and left side pages constituting facing pages. However, the present exemplary embodiment is similarly applicable to a layout in which a plurality of sheets exists on each of the right and left pages.

Although the present exemplary embodiment will be described below based on a case where facing pages include the right and left pages, the present exemplary embodiment is similarly applicable to two vertically arranged pages and to a plurality of pages (two or more pages).

In step S308, in response to a user editing operation, the control unit 201 performs editing processing by changing layout positions of thumbnail images, sizes of the thumbnail images, and clipping areas displayed on pages out of the thumbnail images. In this case, the thumbnail images arranged on pages are not complete thumbnail images but partially clipped areas (clipping areas). The control unit 201 generates book data according to the result of the editing processing in step S308, and temporarily stores the result in a memory, such as the RAM 203.

When the control unit 201 receives an instruction for ending the electronic book editing processing in response to a user operation (YES in step S309), then in step S310, the control unit 201 updates the book data based on the result of the last editing processing, and stores the result in the storage apparatus 204.

Figure 5:
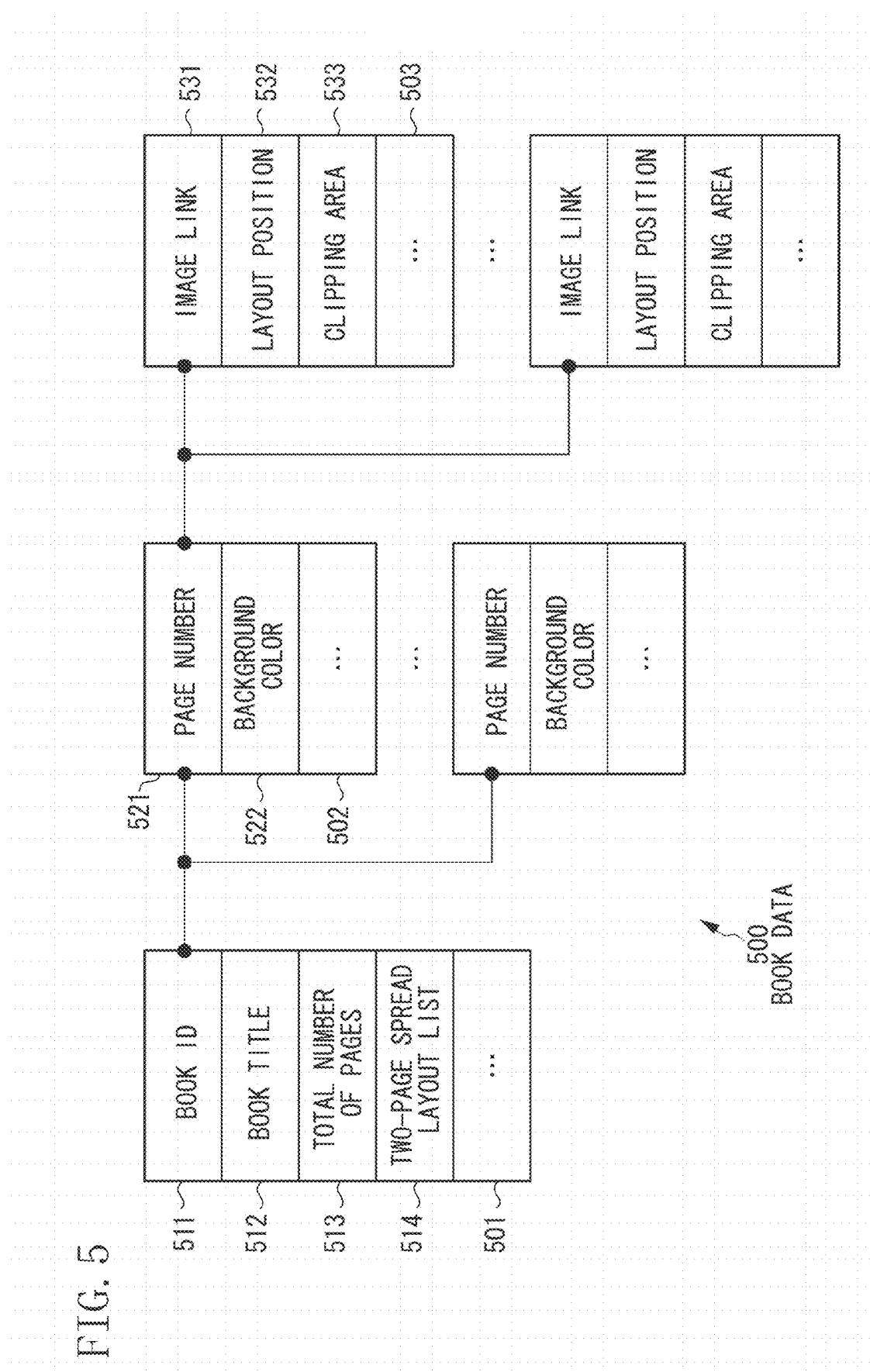
FIG. 5 illustrates an exemplary configuration of book data according to an exemplary embodiment of the present invention.

An exemplary book data configuration according to the present exemplary embodiment will be described below with reference to FIG. 5. Book data 500 has a hierarchical structure including book information 501, page information 502, and image information 503 from the highest layer downward. Each piece of information includes a link to the subordinate layer. The book information 501 includes information about the entire electronic book, such as a book ID 511, a book title 512, a total page number 513, and a two-page spread layout list 514 which is a list of page numbers having the two-page spread layout (described below). The two-page spread layout list 514 includes page numbers of one of two pages constituting facing pages on which images are arranged in the two-page spread layout. Although the present exemplary embodiment is described based on the preceding page, the description also applies to the following page. The two-page spread layout list 514 may include image IDs for uniquely identifying images arranged in the two-page spread layout. The page information 502 includes information about a page, such as a page number 521 for uniquely identifying a page in the electronic book, and a background color 522. The image information 503 includes information about an image, such as an image link 531 indicating the file path of an image laid out on each page, a layout position 532 of the image laid out on each page, and a clipping area 533 of the image. When an image is arranged in the two-page spread layout, the image information 503 of the image is linked with the page information 502 of one of two pages constituting the facing pages. Thus, the book data 500 includes various information required to achieve the electronic book obtained in the editing processing in step S308.

Figure 6:
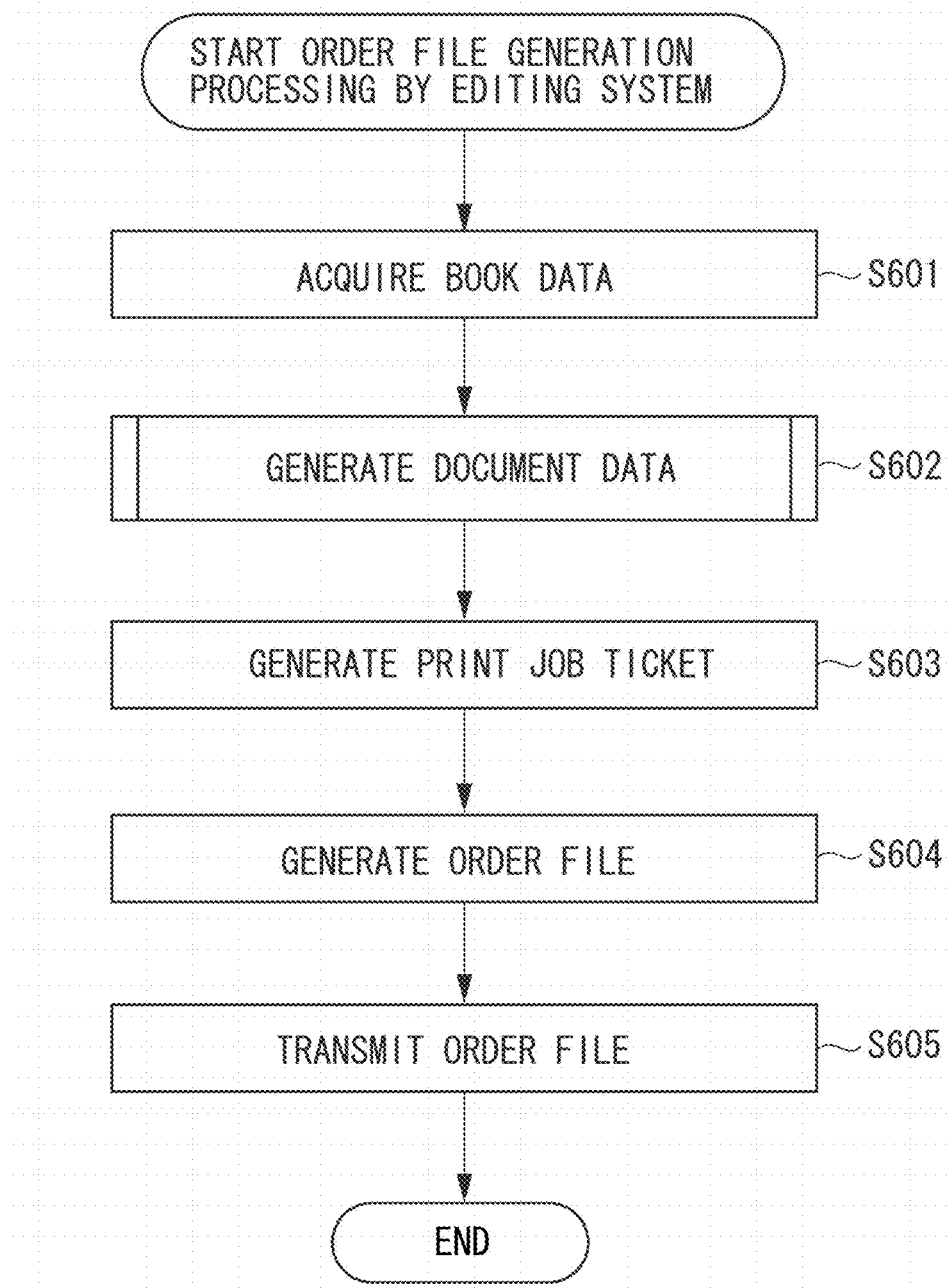
FIG. 6 illustrates exemplary order file generation processing by the editing system according to an exemplary embodiment of the present invention.

Bookbinding printing order processing by the editing system 101 according to the present exemplary embodiment will be described below with reference to FIG. 6. The following processing is implemented when the control unit 201 of the editing system 101 reads the electronic book editing application program from the storage apparatus 204, and controls each of the above-described modules according to the program.

In step S601, in response to a user selection operation, the control unit 201 acquires the book ID of the electronic book as an order target, and reads the book data associated with the book ID 511 from the storage apparatus 204. In step S602, the control unit 201 performs document data generation processing (described below) according to the book data. Document data is generated for each single-side page which belongs to each component of the electronic book, such as the front cover page, body pages, and the back cover page. The document data is generated in a general-purpose format for electronic documents, such as the portable document format (PDF) so as to be usable by various printing control systems.

Figure 7:
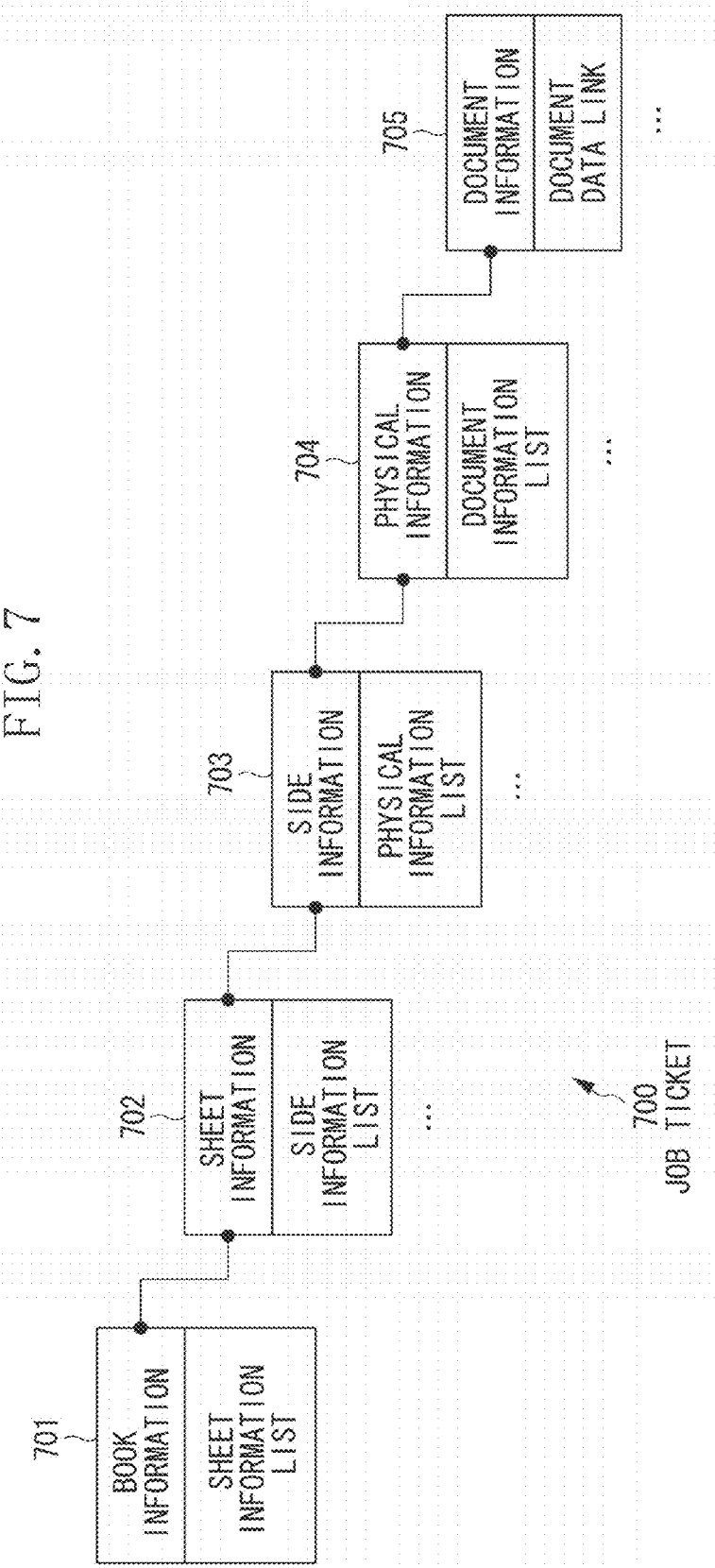
FIG. 7 illustrates an exemplary configuration of a job ticket according to an exemplary embodiment of the present invention.

In step S603, the control unit 201 generates a job ticket according to print setting information input in response to a user operation and the book data acquired in step S601. The job ticket is a data structure having the document data as a minimum unit. The structure of the job ticket defines the layout of the document data on a sheet. One job ticket is generated for each job. FIG. 7 illustrates an exemplary job ticket according to the present exemplary embodiment. The job ticket is generated in a format based on the extended markup language (XML), such as the job definition format (JDF). A job ticket for bookbinding printing of an electronic book includes a set of sheets each having two sides (front and back sides). Each side has an area (physical page) for arranging the document data. Each physical page includes a set of the document data as a minimum unit. The configuration of a job ticket will be described below with reference to FIG. 7. The highest-level node of the job ticket is book information 701 which includes information about the entire electronic book, such as the title of the electronic book, the total number of pages, and a two-page spread layout list indicating page numbers of the two-page spread layout (book information). The book information 701 further includes a list of sheet information (sheet information list). The second-level node is sheet information 702 which includes information about a sheet, such as sheet size, sheet type, sheet feed slot specification for the printing apparatus 103 (sheet information), and a list of information about sides arranged on each sheet (side information list). The third-level node is side information 703 which includes information specific to a side (side information), and a list of information about a physical page arranged on the side (physical information list). In the case of two-sided printing, two pieces of physical page information belong to one side. The fourth-level node is physical page information 704 which includes information about a physical page, such as size, header, and footer of the physical page (physical information), and a list of information about document data constituting the physical page (document information list). The lowest-level node is document data information 705 which includes information about document data (document information), and a link to the document data entity (document data link).

In step S604, the control unit 201 generates an order file including document data and a job ticket. In step S605, the control unit 201 transmits the order file to the printing control system 102 via the network 104. The order file may incorporate the document data and the job ticket into one file. Alternatively, the document data and the job ticket may be stored as different files in the same folder, and compressed on a folder basis into one file, for example, in the ZIP format. The order file transmission in step S605 may be executed each time an order file is generated in step S604. Alternatively, when a predetermined number of order files have been generated or when a predetermined time duration has elapsed, a plurality of order files may be collectively transmitted.

Figure 8:
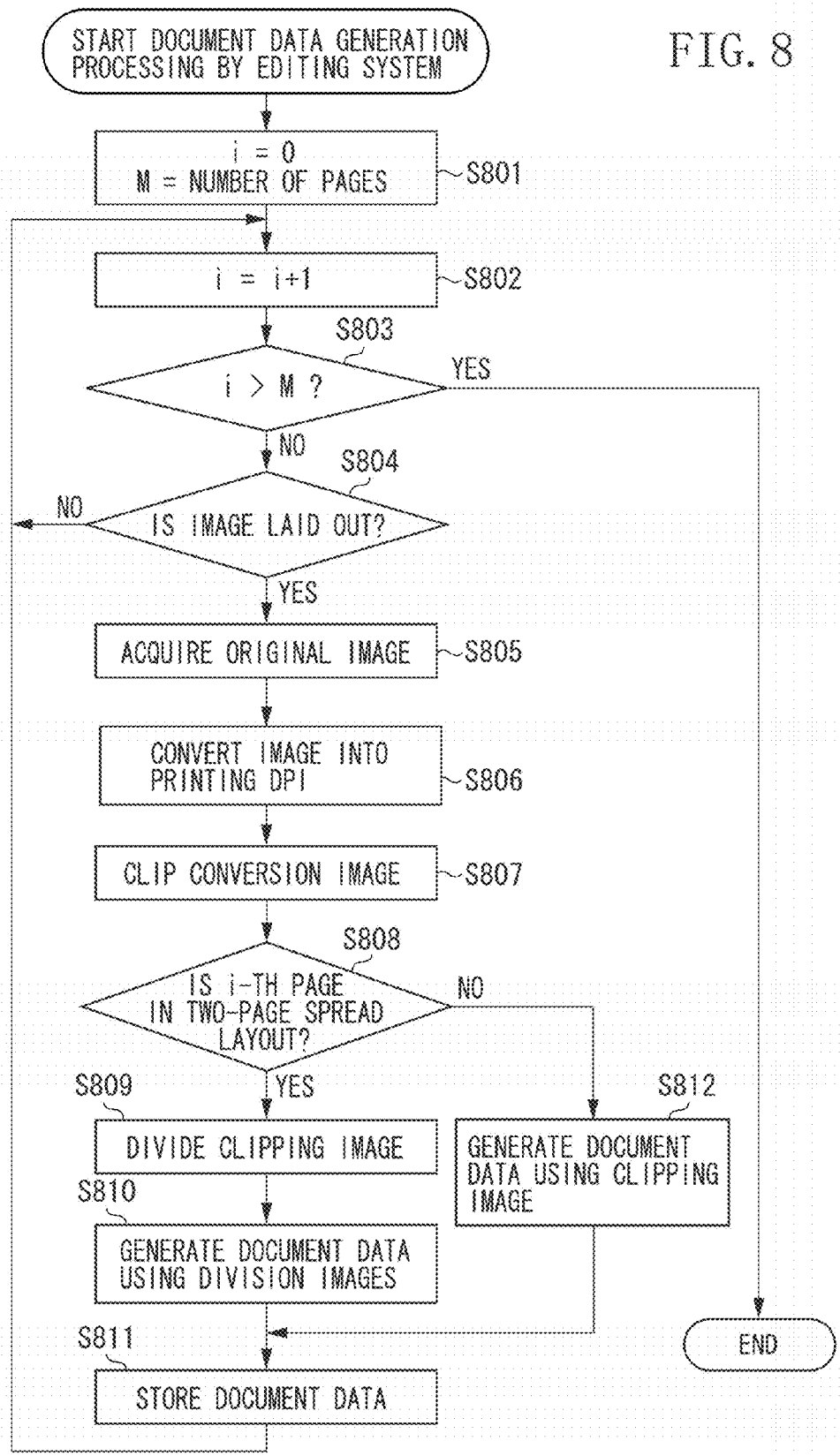
FIG. 8 illustrates exemplary document data generation processing by the editing system according to an exemplary embodiment of the present invention.

Document data generation processing in step S602 will be described below with reference to FIG. 8.

In step S801, the control unit 201 assigns "0" to a variable i and assigns "513" (total number of pages of the book data 500) to a variable M to initialize the variables. In step S802, the control unit 201 adds "1" to the variable i. In step S803, the control unit 201 compares the variable i with the variable M. When the value of the variable i is not larger than the value of the variable M (NO in step S803), then in step S804, the control unit 201 determines whether an image is laid out on the i-th page. Specifically, in step S804, the control unit 201 determines whether there exists the image information 503 associated with the page information 502 of page number "i".

When there exists the image information 503 associated with the page information 502 of page number "i" (YES in step S804), then in step S805, the control unit 201 acquires original image files based on a file path stored in the image link 531 of the image information 503 associated with the page information 502 of the i-th page. When the i-th page is in the two-page spread layout, in step S805, the control unit 201 acquires original image files corresponding to thumbnail images laid out between the i-th and the (i+1)-th pages. When the image information 503 associated with the page information 502 of page number "i" does not exist (NO in step S804), the processing returns to step S802.

In step S806, the control unit 201 performs image conversion processing in which the original image file acquired in step S805 is converted into a resolution (printing DPI) suitable for printing. The image conversion processing may be performed such that the original image file is converted into a desired resolution after it is converted into the bit map data format. The processing in step S806 is intended to reduce the data size through image conversion processing to reduce communication load and processing load, and therefore may be skipped as necessary. The resolution most suitable for printing may be determined by the sheet size and the capability of the printing apparatus 103. In step S807, based on the clipping area 533, the control unit 201 performs clipping processing on the conversion image generated in step S806.

In step S808, based on the two-page spread layout list 514, the control unit 201 determines whether the i-th page is in the two-page spread layout. When the i-th page is in the two-page spread layout (YES in step S808), then in step S809, based on the layout position 532 of the image of the i-th page and the stitch position of the facing pages, the control unit 201 divides the clipping image generated in step S807 by the stitch of the facing pages to generate division images. The control unit 201 may use the entire conversion image without performing the clipping processing. In this case, the control unit 201 performs processing in step S809 on the conversion image.

Figure 9A:
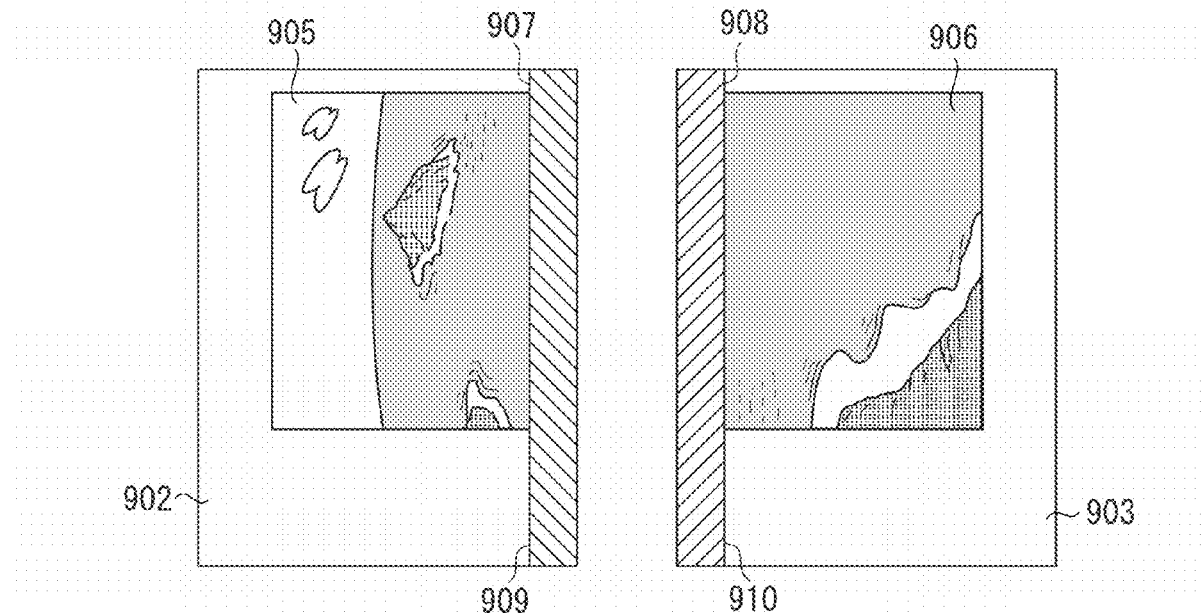
FIGS. 9A and 9B illustrate exemplary document data according to an exemplary embodiment of the present invention.

In step S810, when the i-th page is in the two-page spread layout, the control unit 201 inserts the division images generated in step S809 into the document data for the respective single-side pages. FIG. 9A illustrates exemplary document data in the two-page spread layout. Document data 902 and 903 corresponds to the left side and right side pages 402 and 403 constituting the facing pages, respectively. The document data 902 and 903 are provided with blank areas 907 and 908, respectively, ranging over a predetermined distance from the stitch. Based on the layout position 532, the control unit 201 inserts division images 905 and 906 into the document data 902 and 903, respectively. In this case, boundary lines 909 and 910 of the blank areas 907 and 908, are taken as stitches of the facing pages on the electronic book.

Figure 9B:
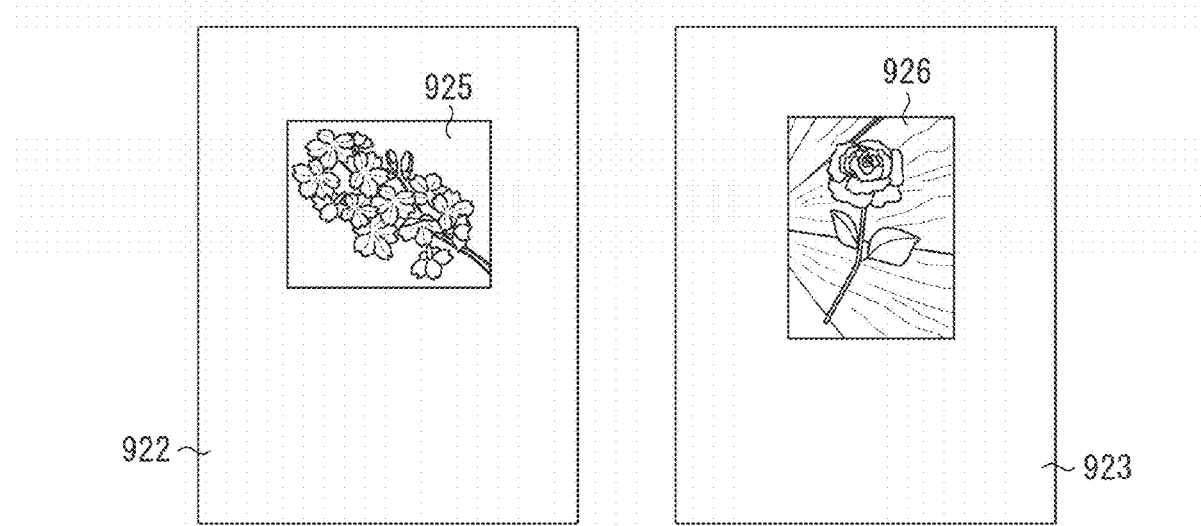

When the i-th page is not in the two-page spread layout (NO in step S808), then in step S812, the control unit 201 generates document data including the clipping image generated in step S807. FIG. 9B illustrates exemplary document data not in the two-page spread layout. Document data 922 and 923 correspond to the left side and right side pages 422 and 423, respectively, constituting the facing pages. Based on the layout position 532, the control unit 201 inserts clipping images 925 and 926 into the document data 922 and 923, respectively. In this case, blank areas are not provided.

In step S811, the control unit 201 stores in the storage apparatus 204 the document data generated in step S810 as document data of the i-th page.

In step S802, the control unit 201 adds "1" to the variable i. When the value of the variable i is larger than the value of the variable M (YES in step S803), the document data generation processing is completed for all pages, and the processing ends.

Figure 10:
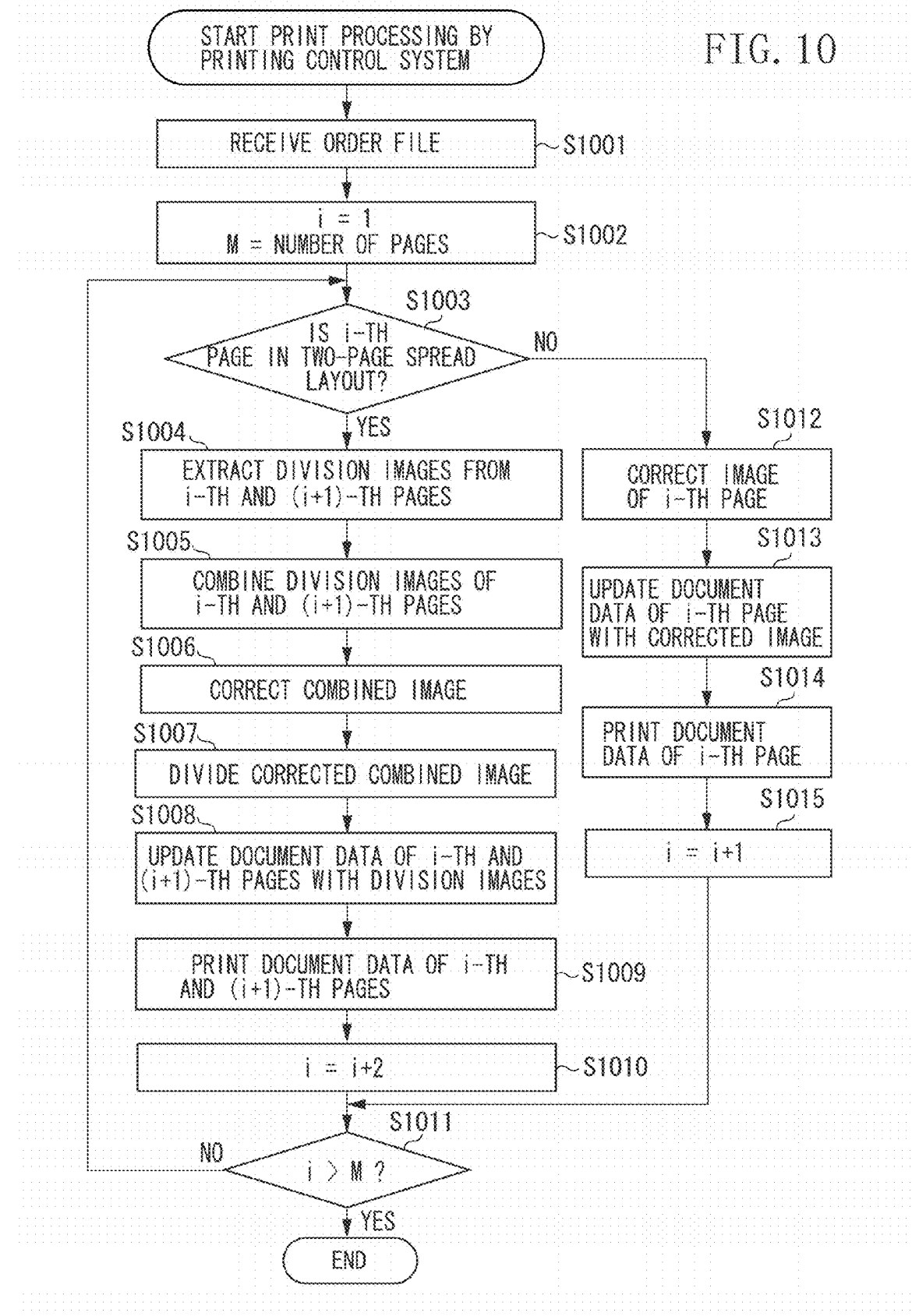
FIG. 10 illustrates exemplary printing processing by a printing control system according to an exemplary embodiment of the present invention.

Bookbinding printing by the printing control system 102 according to the present exemplary embodiment will be described below with reference to FIG. 10. The following processing is implemented when the control unit 231 of the printing control system 102 reads a print processing application program from the storage apparatus 234, and controls each of the above-described modules according to the program.

In step S1001, the control unit 231 receives an order file from the editing system 101. In step S1002, the control unit 231 assigns "1" to the variable i, assigns the total number of pages of the book information 701 of a job ticket 700 to the variable M to initialize the variables.

In step S1003, based on the two-page spread layout list of the book information 701, the control unit 231 determines whether the i-th page is in the two-page spread layout. When the i-th page is in the two-page spread layout (YES in step S1003), the processing proceeds to step S1004. When the i-th page is not in the two-page spread layout (NO in step S1003), the processing proceeds to step S1012.

In step S1004, the control unit 231 extracts a division image from the document data of the i-th page, and extracts a division image from the document data of the (i+1) page. In step S1005, the control unit 231 combines the extracted division images to generate a combined image. At this time, the control unit 231 stores the combined position in a memory, such as the RAM 233.

In step S1006, the control unit 231 performs correction processing, for example, color adjustment on the combined image. Specifically, the control unit 231 makes the black color of a monochrome image clear, or makes a specific major color vivid. The correction processing according to the present exemplary embodiment is intended to optimize images subjected to printing according to the print processing application program of the printing control system 102 and the printing capability of the printing apparatus 103. The correction processing is executed not by the editing system 101 but by the printing control system 102.

In step S1007, the control unit 231 divides the corrected combined image based on the combined position stored in step S1004 to generate division images again. In step S1008, the control unit 231 updates the document data of the i-th and the (i+1)-th pages with the corrected division images. In step S1009, the control unit 231 performs print processing based on the updated document data of the i-th and the (i+1)-th pages. In step S1010, the control unit 231 adds "2" to the variable i. When the value of the variable i is not larger than the variable M (NO in step S1011), the processing returns to step S1003.

When the i-th page is not in the two-page spread layout (NO in step S1003), then in step S1012, the control unit 231 performs the correction processing on the images included in the document data of the i-th page. In step S1013, the control unit 231 updates the document data of the i-th page with the corrected image. The correction processing performed in step S1012 is similar to that in step S1006.

In step S1014, the control unit 231 performs print processing based on the updated document data of the i-th page. In step S1015, the control unit 231 adds "1" to the variable i. Then, the processing proceeds to step S1011.

According to the present exemplary embodiment, even in a case where an image laid out between facing pages is divided into two pieces at the stitch position to generate division images, the division images are arranged on the respective pages while avoiding the peripheral of the stitch, and the print processing is performed for the respective pages, common correction processing is applicable to respective division images. Thus, the relevant one image can be adjusted to the same tint.

A second exemplary embodiment will be described below based on a case where the editing system 101 does not generate division images in the document data generation processing in step S602. Descriptions of elements common to those of the first exemplary embodiment will be omitted. Only elements specific to the present exemplary embodiment will be described in detail below.

Figure 11:
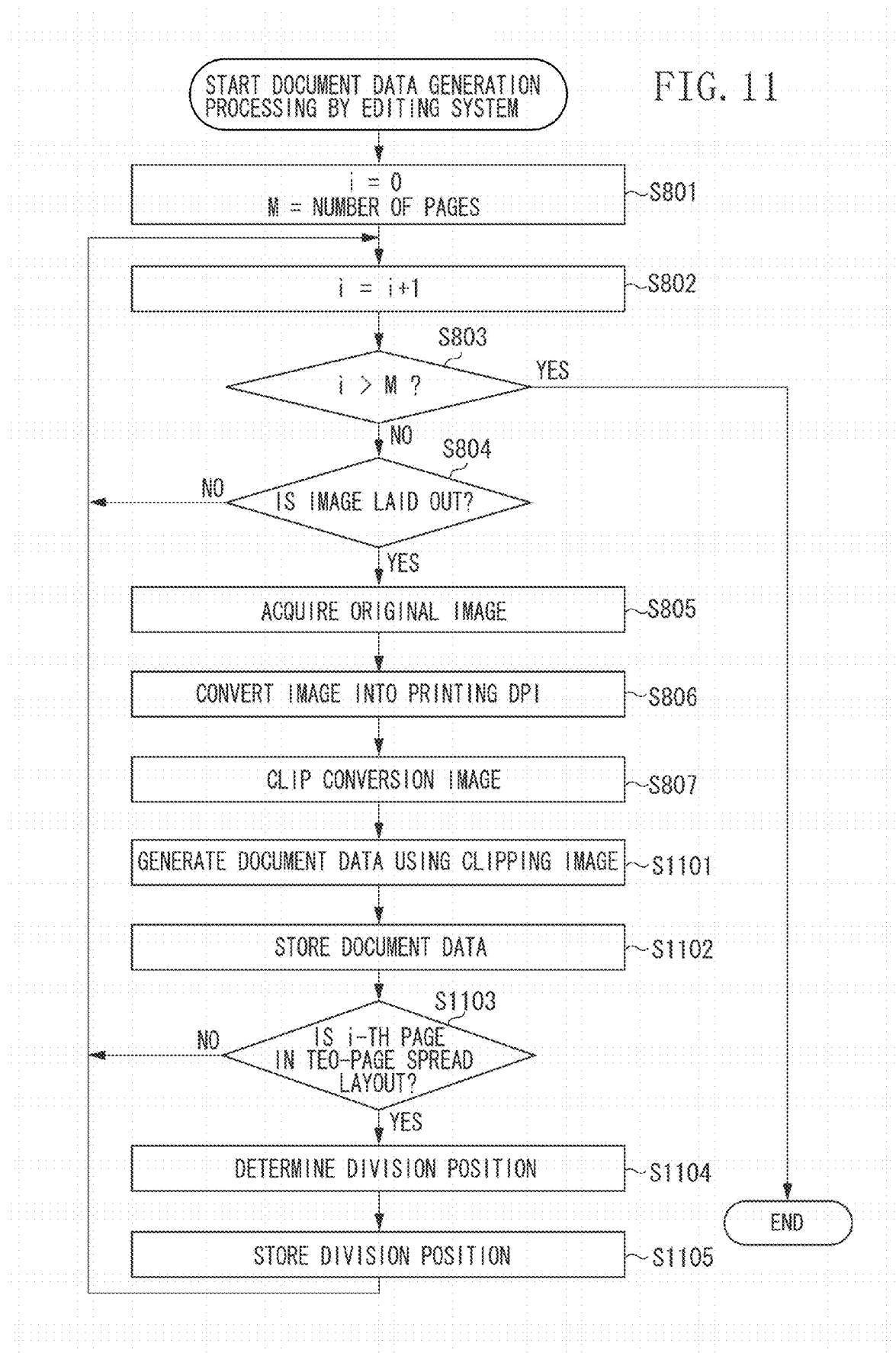
FIG. 11 illustrates exemplary document data generation processing by the editing system according to an exemplary embodiment of the present invention.

Operations of the editing system 101 according to the present exemplary embodiment will be described below with reference to FIG. 11. First, the control unit 201 of the editing system 101 performs similar processing to that in steps S801 to S807 of FIG. 8. In step S1101, the control unit 201 generates document data including a clipping image. In step S1102, the control unit 201 stores in the storage apparatus 204 the generated document data as document data of the i-th page. In step S1103, based on the two-page spread layout list 514, the control unit 201 determines whether the i-th page is in the two-page spread layout. When the i-th page is in the two-page spread layout (YES in step S1103), then in step S1104, the control unit 231 determines as a division position the stitch position of the image and the information indicating the area to be arranged on the i-th page. In step S1105, the control unit 231 stores the determined division position. The division position may be appended to the document data, or appended to the print job ticket generated in step S603.

Figure 12:
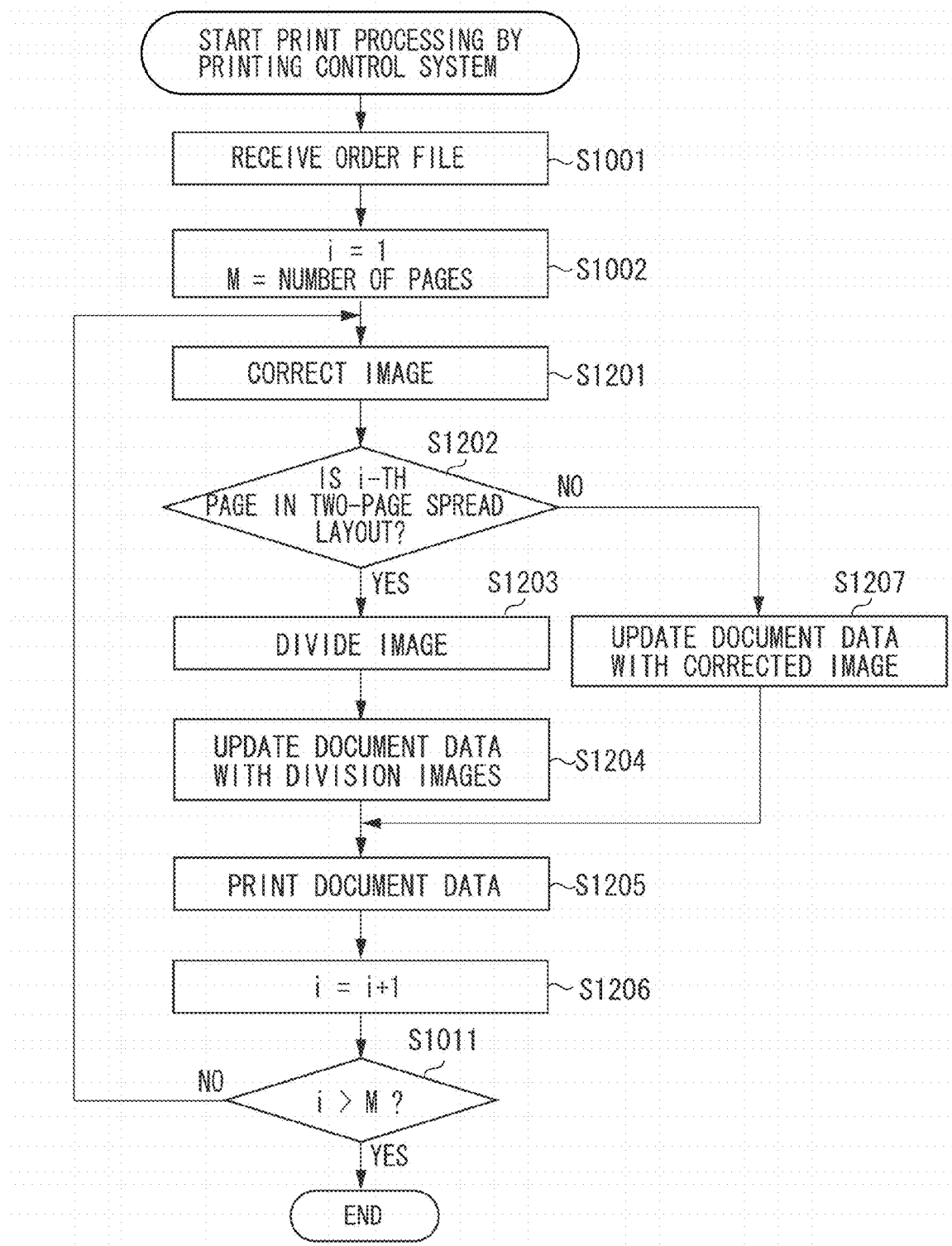
FIG. 12 illustrates exemplary printing processing by a printing control system according to an exemplary embodiment of the present invention.

Operations of the printing control system 102 according to the present exemplary embodiment will be described below with reference to FIG. 12. The control unit 231 of the printing control system 102 performs similar processing to that in steps S1001 and S1002 of FIG. 10. The control unit 231 does not perform processing equivalent to the image combination processing in step S1005. In step S1201, the control unit 231 performs correction processing on all of images included in the document data of the i-th page. The correction processing is similar to that in step S1006. In the correction processing according to the present exemplary embodiment, when the common printing control system 102 and the printing apparatus 103 perform the print processing on the same image, the same result of correction can be obtained.

In step S1202, based on the two-page spread layout list of the book information 701, the control unit 231 determines whether the i-th page is in the two-page spread layout. When the i-th page is in the two-page spread layout (YES in step S1202), then in step S1203, the control unit 231 divides the corrected image according to the division position of the document data to generate division images. In step S1204, the control unit 231 updates the document data of the i-th page with the division image on the i-th page side. In step S1205, the control unit 231 performs the print processing based on the updated document data. In step S1206, the control unit 231 adds "1" to the variable i. When the variable i is not larger than the variable M (NO in step S1011), the processing returns to step S1201.

When the i-th page is not in the two-page spread layout (NO in step S1202), then in step S1207, the control unit 231 updates the document data with the corrected image. In step S1205, the control unit 231 performs the print processing based on the updated document data.

According to the present invention, even in a case where bookbinding printing is performed while an image arranged between a plurality of pages constituting facing pages is divided for the respective pages, it is possible to obtain an effect of adjusting images on the facing pages to the same tint after bookbinding printing.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-102583 filed May 14, 2013, which is hereby incorporated by reference herein in its entirety.

What is claimed is:

1. A bookbinding printing system, comprising an editing system and a printing control system, wherein the editing system comprises:
   a layout unit configured to lay out images on facing pages;
   a first division unit configured to divide an image laid out on the facing pages to generate first division images for respective single-side pages;
   a generation unit configured to generate a plurality of pieces of document data corresponding to respective single-side pages by inserting the first division images generated by the first division unit into the respective single-side pages; and
   a transmission unit configured to transmit the document data to a printing control system, and
   wherein the printing control system comprises:
   an adjusting unit configured to perform color adjustment processing on combined images which are generated by combining the first division images extracted from the plurality of pieces of document data transmitted by transmission unit;
   a second division unit configured to divide the combined images adjusted by the adjusting unit to generate second division images;
   an updating unit configured to update the plurality of pieces of the document data by inserting the second division images into the plurality of pieces of document data respectively; and
   a print processing unit configured to perform print processing based on the plurality of pieces of document data updated by the updating unit.

2. The bookbinding printing system according to claim 1, wherein the generation unit generates the document data by providing a blank area ranging over a predetermined distance from the stitch of the facing pages.

3. The bookbinding printing system according to claim 1, wherein the printing control system further comprises:
- a determination unit configured to determine whether the transmitted document data includes an image laid out on facing pages, and
- wherein, when the determination unit determines that the document data includes an image laid out on facing pages, the adjusting unit performs color adjustment processing on the combined image.

4. An information processing apparatus comprising:
- an acquisition unit configured to acquire a plurality of pieces of document data corresponding to respective single-side pages and including first division images which are generated by dividing an image laid out on facing pages;
- an adjusting unit configured to perform color adjustment processing on combined images which are generated by combining the first division images extracted from the plurality of pieces of document data acquired by the acquisitioning unit;
- a division unit configured to divide the combined images adjusted by the adjusting unit to generate second division images;
- an updating unit configured to update the plurality of pieces of document data by inserting the second division images into the plurality of pieces of document data respectively; and
- a print processing unit configured to perform print processing based on the plurality of pieces of document data updated by the updating unit.

5. The information processing apparatus according to claim 4, wherein, in the document data, a blank area is provided ranging over a predetermined distance from the stitch of the facing pages.

6. The information processing apparatus according to claim 4, further comprising:
- a determination unit configured to determine whether the acquired document data includes an image laid out on facing pages,
- wherein, when the determination unit determines that the document data includes an image laid out on facing pages, the adjusting unit performs color adjustment processing on the combined image.

7. A method for controlling an information processing apparatus, the method comprising:
- acquiring a plurality of pieces of document data corresponding to respective single-side pages and including first division image which is generated by dividing an image laid out on facing pages;
- performing color adjustment processing on combined image which is generated by combining the first division images extracted from the acquired plurality of pieces of document data;
- dividing the color adjusted combined image to generate second division images;
- updating the plurality of pieces of document data by inserting the second division images into the plurality of pieces of document data respectively; and
- performing print processing based on the updated plurality of pieces of document data.

8. A non-transitory storage medium storing a program for causing a computer to execute a method comprising:
- acquiring a plurality of pieces of document data corresponding to respective single-side pages and including first division image which is generated by dividing an image laid out on facing pages;
- performing color adjustment processing on combined image which is generated by combining the first division images extracted from the acquired plurality of pieces of document data;
- dividing the color adjusted combined image to generate second division images;
- updating the plurality of pieces of document data by inserting the second division images into the plurality of pieces of document data respectively; and
- performing print processing based on the updated plurality of pieces of document data.

* * * * *